US009148905B2

(12) United States Patent
Matsuo et al.

(10) Patent No.: US 9,148,905 B2
(45) Date of Patent: Sep. 29, 2015

(54) WIRELESS COMMUNICATION APPARATUS, WIRELESS COMMUNICATION SYSTEM AND WIRELESS COMMUNICATION METHOD

(71) Applicant: PANASONIC CORPORATION, Osaka (JP)

(72) Inventors: Kumiko Matsuo, Fukuoka (JP); Toshiyuki Sugitani, Fukuoka (JP); Shinji Fukuda, Fukuoka (JP); Kiyoshi Enjouji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 233 days.

(21) Appl. No.: 13/681,972

(22) Filed: Nov. 20, 2012

(65) Prior Publication Data

US 2013/0136059 A1    May 30, 2013

(30) Foreign Application Priority Data

Nov. 24, 2011    (JP) ................. 2011-256461

(51) Int. Cl.
H04W 88/02       (2009.01)
H04L 1/16        (2006.01)
(Continued)

(52) U.S. Cl.
CPC ............. *H04W 88/02* (2013.01); *H04L 1/1664* (2013.01); *H04L 1/1854* (2013.01); *H04L 12/282* (2013.01); *H04W 28/06* (2013.01)

(58) Field of Classification Search
CPC ............ H04W 72/0446; H04W 24/00; H04W 56/001; H04W 72/0406; H04W 56/00; H04W 56/0025; H04W 88/02; H04W 28/06; H04B 7/26; H04B 7/2659; H04B 10/1149; H04J 3/00; H04J 3/16; H04J 3/22; H04L 1/20; H04L 1/1657; H04L 1/1664; H04L 1/1854; H04L 12/282
USPC ......... 370/347, 328, 276–277, 280, 337, 336, 370/401, 279
See application file for complete search history.

(56) References Cited

U.S. PATENT DOCUMENTS 5,987,019 A   11/1999 Raith
6,466,568 B1  10/2002 Raith
(Continued)

FOREIGN PATENT DOCUMENTS

JP    2001-502488    2/2001
JP    2005-295368    10/2005
(Continued)

OTHER PUBLICATIONS

International Search Report dated Dec. 25, 2012.

*Primary Examiner* — Kwang B Yao
*Assistant Examiner* — Syed M Bokhari
(74) *Attorney, Agent, or Firm* — Seed IP Law Group PLLC

(57) ABSTRACT

A wireless communication system includes a first wireless communication apparatus, a second wireless communication apparatus, and a third wireless communication apparatus which operates as a control station of controlling the first and second wireless communication apparatuses. The third wireless communication apparatus receives data from the first wireless communication apparatus using a first slot, and sends the received data to the second wireless communication apparatus and an acknowledgment of reception of the data to the first wireless communication apparatus using a second slot.

9 Claims, 11 Drawing Sheets

(51) Int. Cl.
*H04L 1/18* (2006.01)
*H04W 28/06* (2009.01)
*H04L 12/28* (2006.01)

(56) References Cited

U.S. PATENT DOCUMENTS

| | | | |
|---|---|---|---|
| 2002/0093928 A1* | 7/2002 | LoGalbo et al. | 370/336 |
| 2006/0082454 A1* | 4/2006 | Fukuda et al. | 340/531 |
| 2006/0256798 A1* | 11/2006 | Quick et al. | 370/401 |
| 2006/0286975 A1 | 12/2006 | Sugitani | |
| 2008/0247336 A1* | 10/2008 | Sugitani | 370/280 |
| 2010/0177684 A1* | 7/2010 | Kore et al. | 370/328 |
| 2014/0226540 A1* | 8/2014 | Park et al. | 370/279 |

FOREIGN PATENT DOCUMENTS

| | | |
|---|---|---|
| JP | 2007-013539 | 1/2007 |
| JP | 2007-013544 | 1/2007 |

* cited by examiner

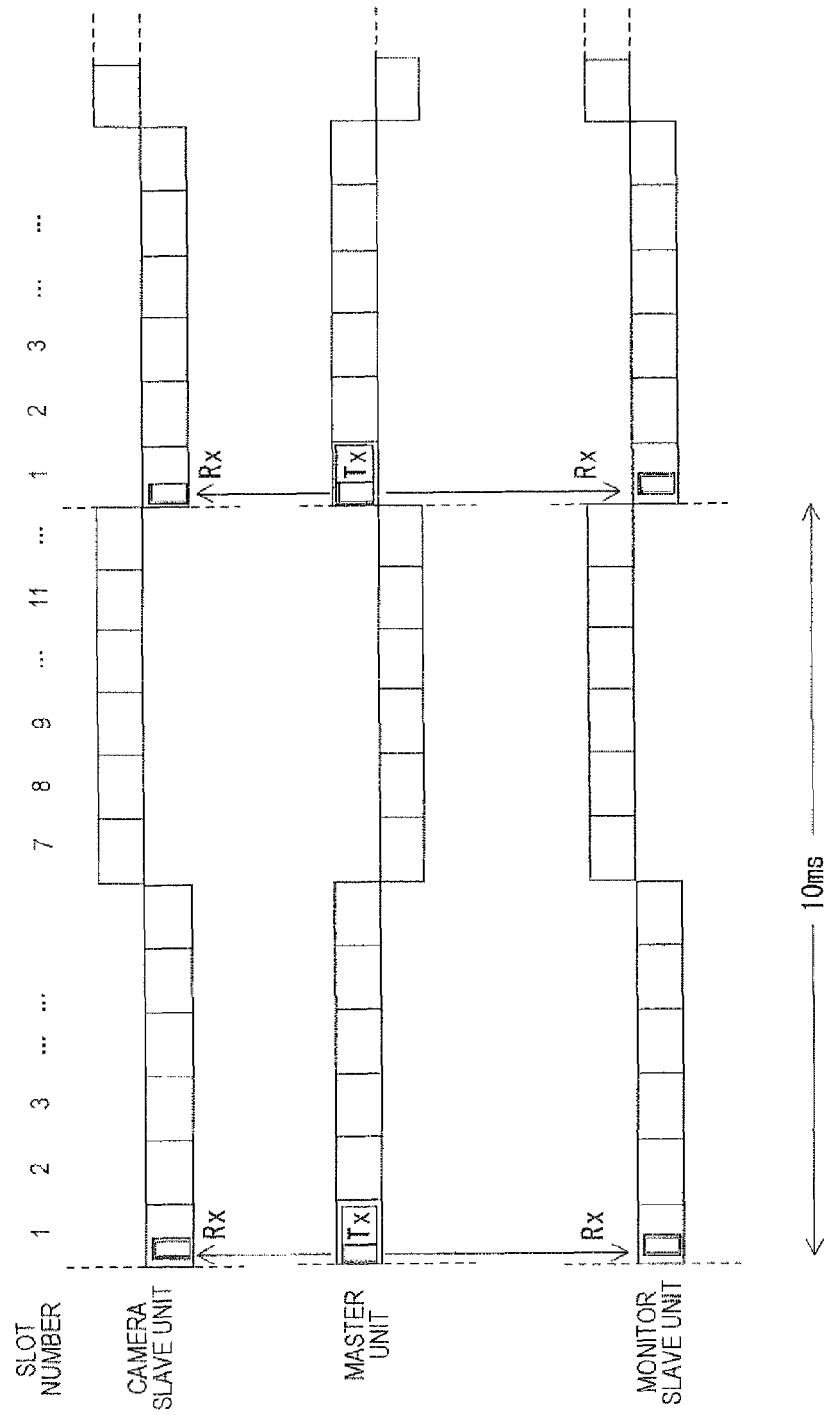

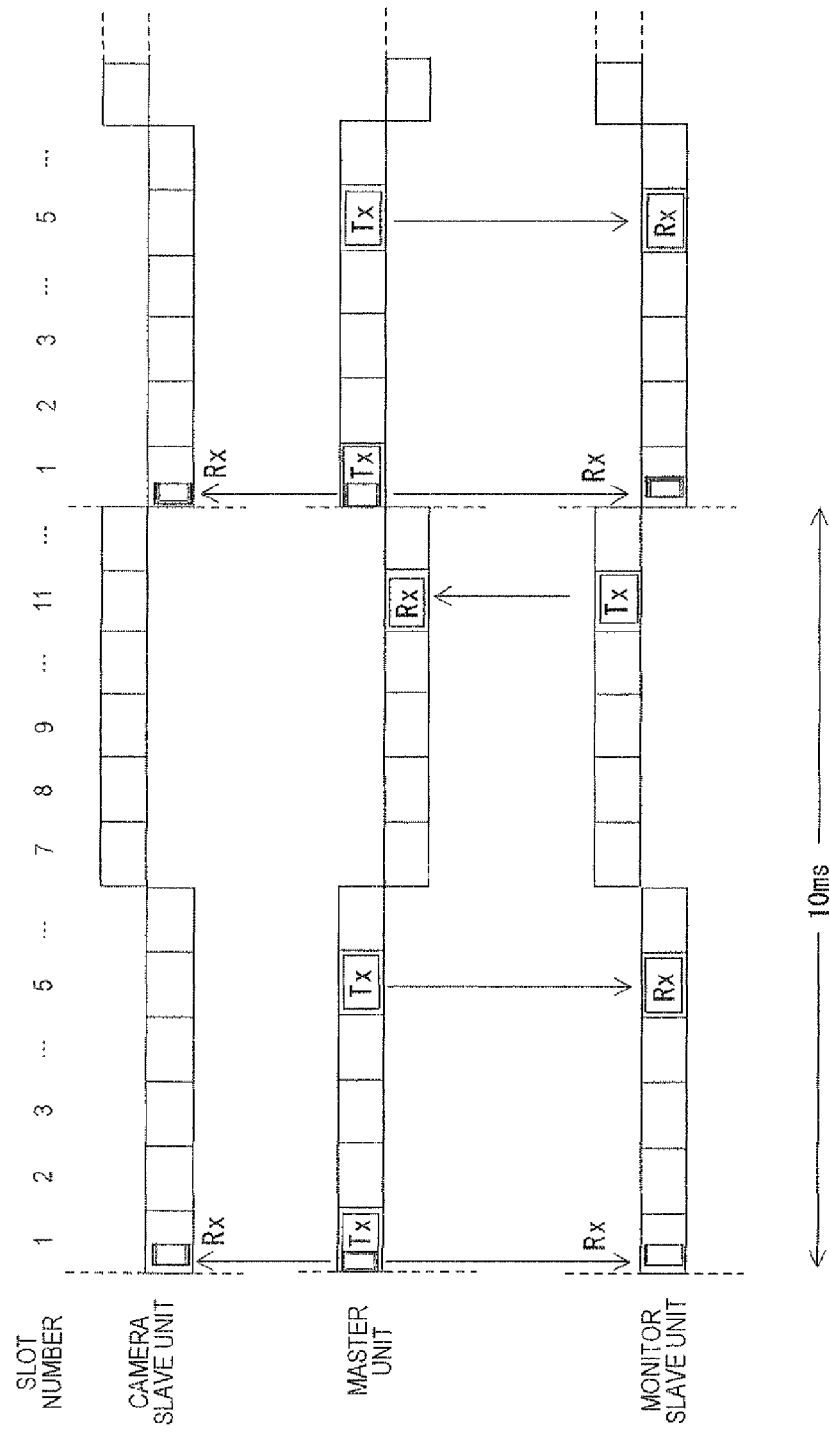

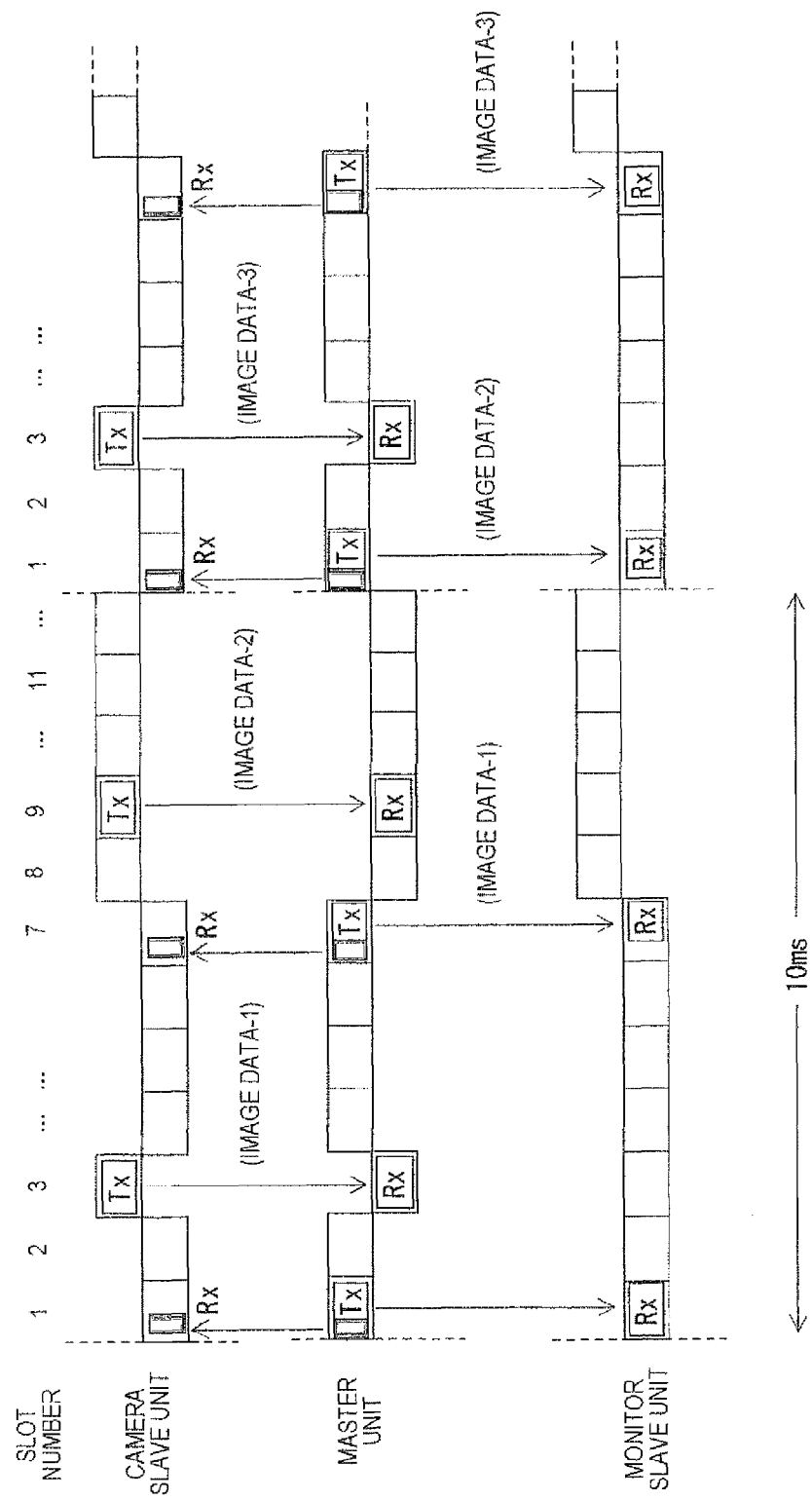

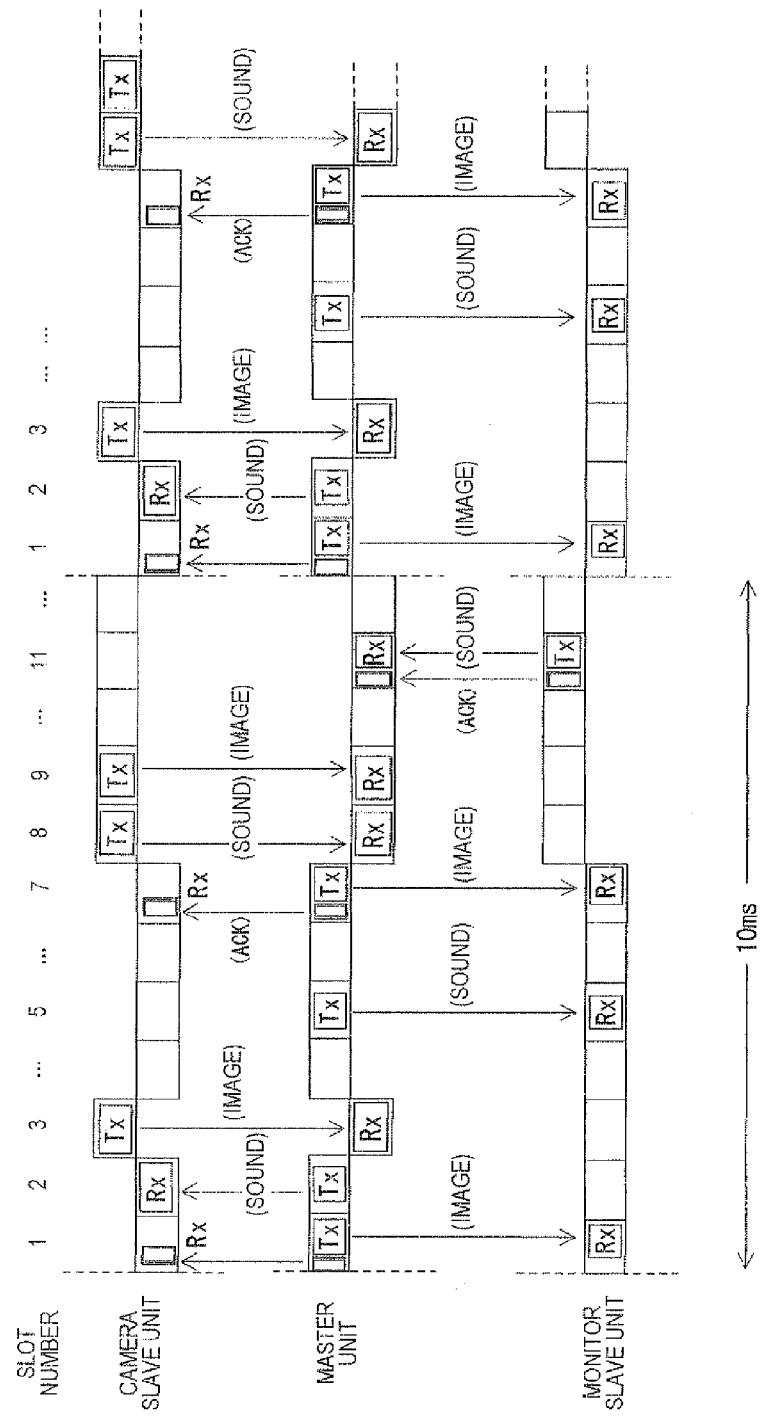

WIRELESS COMMUNICATION APPARATUS, WIRELESS COMMUNICATION SYSTEM AND WIRELESS COMMUNICATION METHOD

BACKGROUND

1. Technical Field

The present invention relates to a wireless communication apparatus, a wireless communication system and a wireless communication method which perform an information communication using a wireless signal.

2. Background Art

In recent years, such video apparatus as door phones and security cameras which use wireless communication have come to be developed because they can be installed easily. Among general TV door phone systems are ones which include a camera-equipped entrance slave unit, a monitor-equipped in-room master unit, and a monitor-equipped wireless slave unit. In such TV door phone systems, the camera-equipped entrance slave unit and the monitor-equipped in-room master unit are wire-connected to each other. When the call button of the camera-equipped entrance slave unit is pushed, a call sound is generated by the monitor-equipped in-room master unit, and at the same time, an image taken by the camera-equipped entrance slave unit is displayed on the monitor-equipped in-room master unit. The monitor-equipped in-room master unit sends, to the monitor-equipped wireless slave unit, using a wireless signal, a call signal and the image that has been received from the camera-equipped entrance slave unit, whereby a call sound is also generated by the wireless slave unit and the same image as displayed on the monitor-equipped in-room master unit is displayed on the monitor-equipped wireless slave unit.

Also in the case of security cameras, easy-to-install wireless security camera systems in which a wireless communication is performed between a camera and a monitor are being developed because wiring construction work is necessary if the camera and the monitor are wire-connected to each other.

For example, JP-A-2007-13539 discloses a door phone system in which even when an outside communication or an extension communication of a cordless phone and a door phone call have occurred simultaneously, the probability of occurrence of a busy state due to insufficiency in wireless communication resources is lowered and the user can be notified of both calls. JP-A-2005-295368 discloses that image data is transmitted plural times and that not only a control signal but also image data is transmitted using a time slot for transmission of a control signal. JP-T-2001-502488 discloses that a downlink is given a broader bandwidth than an uplink and a mobile station sends a retransmission request using a one-slot bandwidth.

SUMMARY

In systems in which an image that has been transmitted from a camera-equipped slave unit is sent to a monitor-equipped in-room master unit and a wireless slave unit, using a wireless signal, and TDMA-TDD (Time Division Multiple Access and Time Division Duplex) wireless communication uses one slot for transmission and one slot for reception in the case where one master unit performs a one-to-one communication with one slave unit. Therefore, one slot pair is occupied by each of an uplink and a downlink as one wireless communication resource for bidirectional communication (symmetrical 1:1 communication).

In ordinary data communication in which in most cases data is transmitted only in one direction or a large difference exists in data amount between an uplink (a communication from a slave unit to a master unit) and a downlink (a communication from a master unit to a slave unit), N slot pairs are used and an asymmetrical communication is performed by allocating 2N−1 slots to one kind of communication and the remaining one slot to the other kind of communication (asymmetrical N:1 communication). The wireless communication resources are thus utilized efficiently. For example, where two slot pairs are used, three slots are allocated to one kind of communication and the remaining one slot is allocated to the other kind of communication. However, the use of plural slot pairs raises a problem that the wireless communication resources may be depleted.

The present invention is directed to a wireless communication system in which TDMA-TDD multiplex communication is performed and which includes a first wireless communication apparatus, a second wireless communication apparatus, and a third wireless communication apparatus which operates as a control station of the first wireless communication apparatus and the second wireless communication apparatus which are tributary stations. The third wireless communication apparatus (master unit) receives data from the first wireless communication apparatus using a first slot, transfers the received data to the second wireless communication apparatus using a second slot, and sends an acknowledgment of reception of the data to the first wireless communication apparatus using the same second slot. Therefore, the master unit need not perform communications by establishing links to the two respective slave stations in parallel.

TDMA-TDD multiplex communication is performed by the wireless communication system and the wireless communication apparatus according to an aspect of the invention. Usually, a total of four slots, in which two slots are in the upstream direction and two slots are in the downstream direction, are necessary when a master unit performs data transfer between two slave units. In contrast, according to the aspect of the invention, since data is transferred to a transfer destination slave unit and an acknowledgment of reception of the data is sent to a transfer source slave unit using the same slot, the master unit need not perform communications by establishing links to the two respective slave stations in parallel. Thus, wireless communication resources can be utilized efficiently.

Furthermore, since the master unit divides data into two divisional data and sends the two divisional data to the transfer destination slave unit using two respective slots, each of the two slots is given an empty area that can be used for sending another signal. The master unit can send control signals for maintaining synchronization using one of the two empty areas and send an acknowledgment to the transfer source slave unit using the other empty area. Thus, it is not necessary to occupy each slot for the purpose of synchronization maintenance or transmission of an acknowledgment. This also contributes to efficient utilization of wireless communication resources.

BRIEF DESCRIPTION OF THE DRAWINGS

FIG. 6 illustrates an example manner of use of slots in an idle state in the door monitoring system according to the embodiment.

FIG. 7 illustrates an example manner of use of slots in a state where a voice call path is established between the monitor slave unit and the master unit in the door monitoring system according to the embodiment.

FIG. 8 illustrates an example manner of use of slots in a state where image data that originate from the camera slave unit are being transferred in the door monitoring system according to the embodiment.

FIG. 9 illustrates an example manner of use of slots in a state where image data originating from the camera slave unit are being transferred and voice call paths are established in the door monitoring system according to the embodiment.

DETAILED DESCRIPTION

Figure 1:
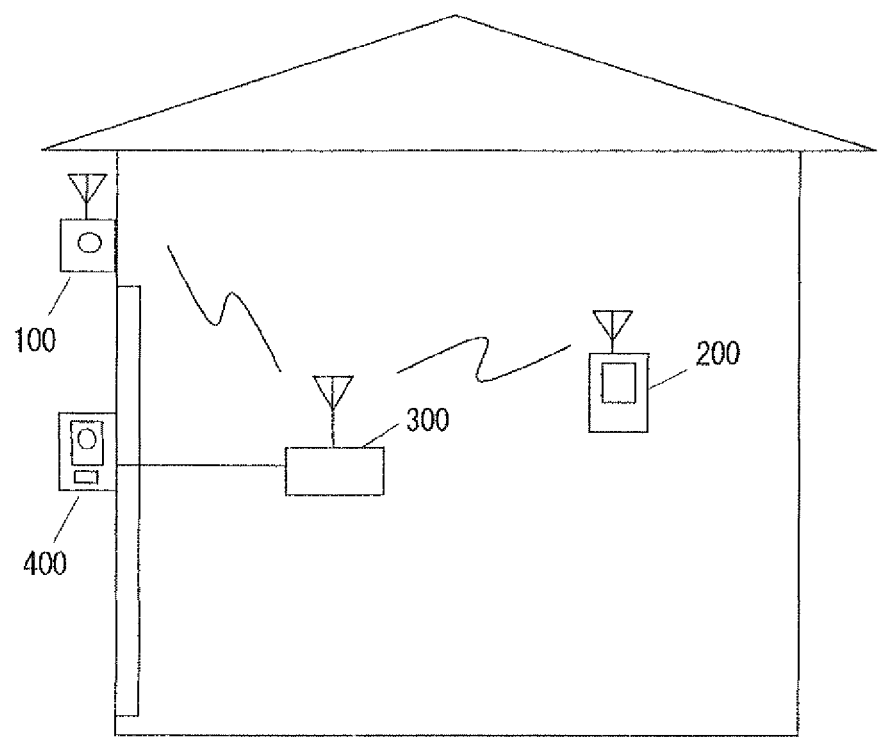
FIG. 1 shows the configuration of a door monitoring system as an embodiment of a wireless communication system according to the present invention.

A first aspect of the present invention provides a wireless communication system that includes a first wireless communication apparatus, a second wireless communication apparatus, and a third wireless communication apparatus which operates as a control station of controlling the first and second wireless communication apparatuses, wherein the first wireless communication apparatus is adapted to receive data from the first wireless communication apparatus using a first slot, and sends the received data to the second wireless communication apparatus and an acknowledgment of reception of the data to the first wireless communication apparatus using a second slot, the first wireless communication apparatus is adapted to receive the acknowledgement which is transmitted from the third wireless communication apparatus using the second slot, and the second wireless communication apparatus is adapted to receive the data which is transmitted from the third wireless communication apparatus using the second slot.

A second aspect of the present invention provides a wireless communication system that includes a first wireless communication apparatus, a second wireless communication apparatus, and a third wireless communication apparatus which operates as a control station of controlling the first and second wireless communication apparatuses, wherein the first wireless communication apparatus includes a first communication unit which is adapted to perform a signal communication with a different wireless communication apparatus in accordance with TDMA (Time Division Multiple Access) scheme, the second wireless communication apparatus includes a second communication unit which is adapted to perform a signal communication with a different wireless communication apparatus in accordance with TDMA scheme, and the third wireless communication apparatus includes a third communication unit which is adapted to perform a signal communication with a different wireless communication apparatus in accordance with TDMA scheme and a control section which is adapted to cause the first wireless communication apparatus and the second wireless communication apparatus to synchronize with the third wireless communication apparatus by sending a control signal to the first wireless communication apparatus and the second wireless communication apparatus using the third communication unit, and to control a transfer operation of receiving data from the first wireless communication apparatus and transferring the received data to the second wireless communication apparatus, wherein the third wireless communication apparatus designates a first slot and a second slot and sends information indicating the first slot and the second slot while being contained in the control signal to the first wireless communication apparatus and the second wireless communication apparatus prior to the transfer operation, wherein the first slot is used for receiving the data from the first wireless communication apparatus and the second slot is used for sending the received data to the second wireless communication apparatus, and the transfer operation includes that the first wireless communication apparatus sends data using the first slot according to the information contained in the control signal, the third wireless communication apparatus receives the data from the first wireless communication apparatus using the first slot, the third wireless communication apparatus sends the received data to the second wireless communication apparatus and an acknowledgment of reception of the data to the first wireless communication apparatus using the second slot, the second wireless communication apparatus receives the data from the third wireless communication apparatus using the second slot according to the information contained in the control signal, and the first wireless communication apparatus receives the acknowledgement from the third wireless communication apparatus using the second slot according to the information contained in the control signal.

In the above aspects, when a master unit performs data transfer between two slave units, the master unit transfers data received from one slave unit to the other transfer destination slave unit and sends an acknowledgment of reception of the data to the transfer source slave unit using the same slot. Therefore, the master unit needs not perform communications by establishing links to the two respective slave stations in parallel. Thus, wireless communication resources can be utilized efficiently. Conventionally, a total of four slots (two in the upstream direction and two in the downstream direction) are necessary when a master unit performs data transfer between two slave units. In contrast, according to the above aspects, since data is transferred to the transfer destination slave unit and an acknowledgment of reception of the data is sent to the transfer source slave unit using the same slot, at least only three slots are necessary.

A third aspect of the present invention provides a wireless communication system that includes a first wireless communication apparatus, a second wireless communication apparatus, and a third wireless communication apparatus which operates as a control station of controlling the first and second wireless communication apparatuses, wherein the third wireless communication apparatus receives data from the first wireless communication apparatus using a first slot, divides the data into two divisional data, sends one of the two divisional data to the second wireless communication apparatus using the second slot and the other divisional data to the second wireless communication apparatus using a third slot, sends a control signal for maintaining the synchronization using one of the second slot and the third slot, and sends an acknowledgment of reception of the data to the first wireless communication apparatus using the other of the second slot and the third slot, the first wireless communication apparatus receives the acknowledgement which is transmitted from the third wireless communication apparatus using the other of the second slot and the third slot, and the second wireless communication apparatus receives the data which is transmitted from the third wireless communication apparatus using both the second slot and the third slot.

In the third aspect, since the master unit divides data into two divisional data and sends the two divisional data to the transfer destination slave unit using two respective slots. Therefore, each of the two slots is given an empty area that can be used for sending another signal. The master unit can send control signals for maintaining synchronization using one of the two empty areas and send an acknowledgment to the transfer source slave unit using the other empty area. Thus, it is not necessary to occupy each slot for the purpose of synchronization maintenance or transmission of an acknowledgment. This also contributes to efficient utilization of wireless communication resources.

(Embodiment 1)

A door monitoring system as an embodiment of a wireless communication system will be hereinafter described with reference to the drawings. FIG. 1 shows the configuration of the door monitoring system as an embodiment of the wireless communication system. Individual functional blocks of the door monitoring system which includes wireless communication apparatuses will be described below with reference to FIG. 1.

In FIG. 1, reference numeral 100 denotes a camera slave unit which sends image data taken by a camera using a wireless signal. The camera slave unit 100 is mainly installed outdoors, that is, near an entrance or a position from which a gate and its neighborhood can be seen. Reference numeral 300 denotes a master unit. Reference numeral 200 designates a monitor slave unit for displaying an image mainly taken by the camera slave unit 100. The monitor slave unit 200 receives and displays image data that is transferred from the camera slave unit 100. Each of the master unit 300, the camera slave unit 100, and the monitor slave unit 200 has a function of performing a wireless communication according to TDMA-TDD (Time Division Multiple Access) and DECT (Digital Enhanced Cordless Telecommunications) scheme. Reference numeral 400 denotes an entrance slave unit which has an imaging function and a voice call function and is wire-connected to the master unit 300. The entrance slave unit 400 is mainly installed near an entrance door or a position which is near the gate and allows a visitor to make a voice call.

Figure 2:
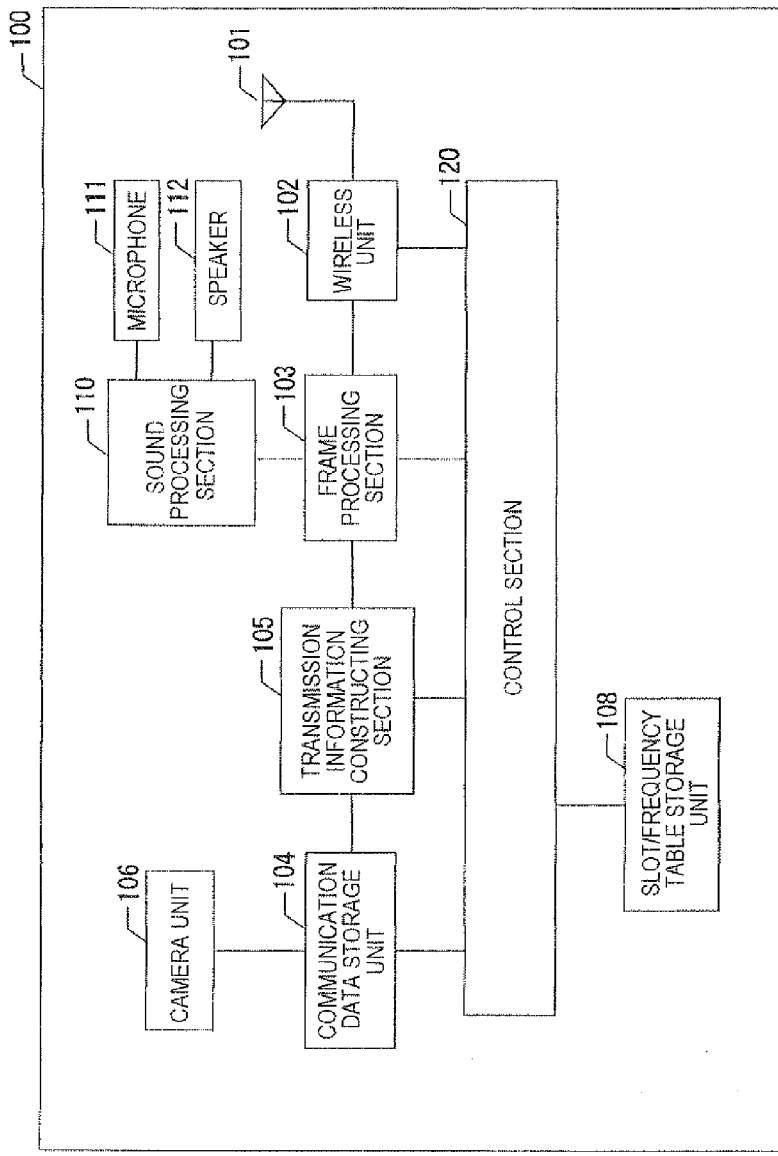
FIG. 2 is a functional block diagram of a camera slave unit of the door monitoring system according to the embodiment.

Individual functional blocks of the door monitoring system will be described below. FIG. 2 is a functional block diagram of the camera slave unit 100. In FIG. 2, reference numeral 101 denotes an antenna. Reference numeral 102 denotes a wireless unit which performs a wireless communication according to TDMA-TDD and DECT scheme; that is, the wireless unit 102 modulates and amplifies an input data sequence and outputs resulting data, and also amplifies and demodulates a received wireless signal and outputs resulting reception data. Reference numeral 103 denotes a frame processing section which adds a sync signal necessary for TDMA-TDD communication and an error detection signal (i.e., a signal for error detection) to a control signal, image data, or a sound signal and generates a transmission data sequence with timing that is suitable for the timing of a TDMA frame and slot. Furthermore, the frame processing section 103 performs error detection processing on a received reception data sequence with timing that is suitable for the timing of a TDMA frame and slot, and outputs a control signal, a sound signal, or other information received in an error-free slot. Still further, the frame processing section 103 informs a control section 120 of frame timing and slot timing.

Reference numeral 104 denotes a communication data storage unit for storing image data of one screen. Reference numeral 105 denotes a transmission information constructing section which reads image data from the communication data storage unit 104, divides it into pieces of data each of which can be transmitted in one slot, and outputs resulting transmission data after attaching order-indicative numbers to them. Reference numeral 106 designates a camera unit which is composed of a camera and a conversion section for converting video taken by the camera into image data of one screen and outputting the convert image data. Reference numeral 108 stands for a slot/frequency table storage unit which is stored with a slot/frequency table used in the DECT scheme.

Reference numerals 111 and 112 denote a microphone and a speaker, respectively. Reference numeral 110 denotes a sound processing section which amplifies and converts into a PCM signal an analog sound signal that is input through the microphone 111, and which also converts a PCM sound signal into an analog sound signal to be output to the speaker 111 and amplifies the analog sound signal. Reference numeral 120 designates the control section which controls the entire camera slave unit 100.

Figure 4:
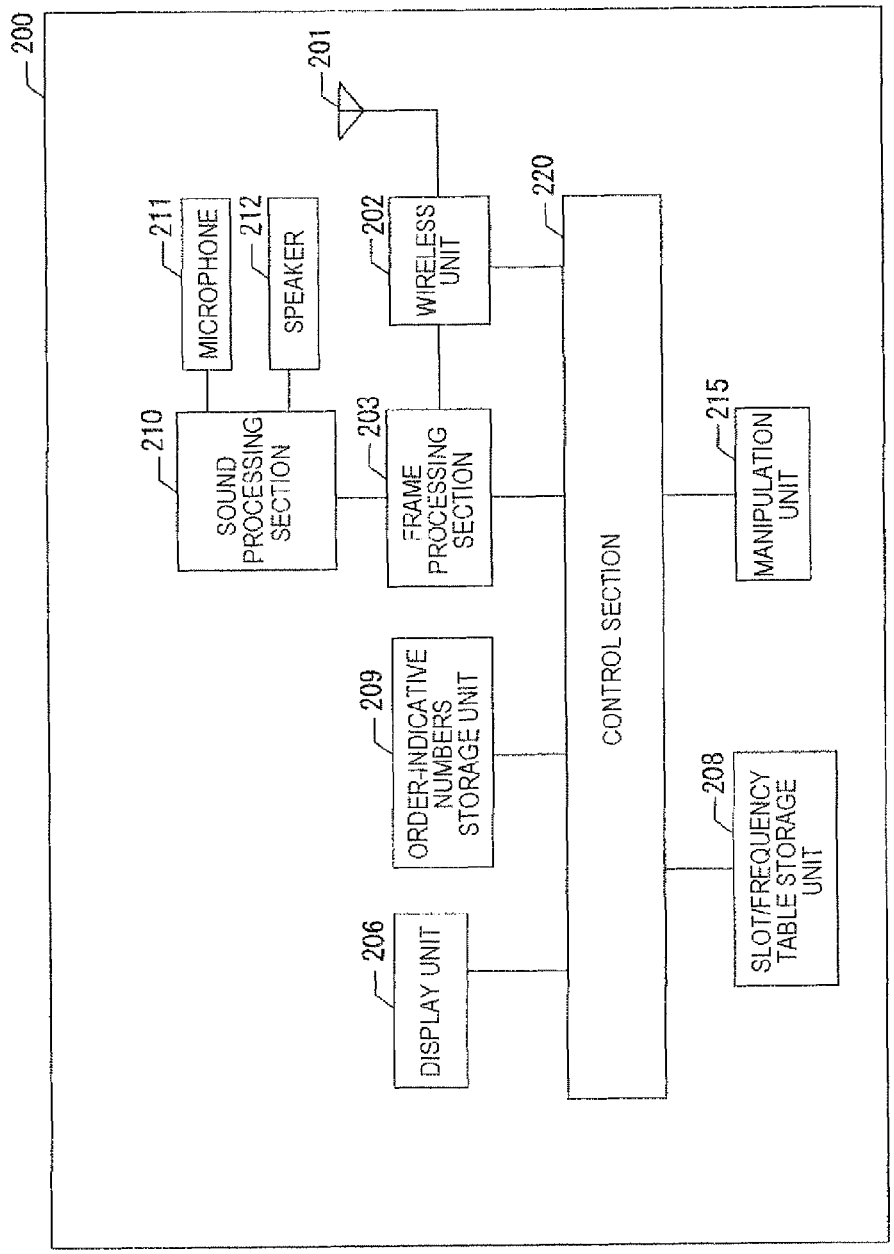
FIG. 4 is a functional block diagram of a monitor slave unit of the door monitoring system according to the embodiment.

FIG. 4 is a functional block diagram of the monitor slave unit 200 of the door monitoring system. In FIG. 4, reference numeral 201 denotes an antenna. Reference numeral 202 denotes a wireless unit which performs a wireless communication according to TDMA-TDD and DECT scheme; that is, the wireless unit 202 modulates and amplifies an input data sequence and outputs resulting data, and also amplifies and demodulates a received wireless signal and outputs resulting reception data. Reference numeral 203 denotes a frame processing section which adds a sync signal necessary for TDMA-TDD communication and an error detection signal (i.e., a signal for error detection) to a control signal or a sound signal and generates a transmission data sequence with timing that is suitable for the timing of a TDMA frame and slot. Furthermore, the frame processing section 203 performs error detection processing on a received data sequence with timing that is suitable for the timing of a TDMA frame and slot, and outputs a control signal, image data, a sound signal, or other information received in error-free slots. Still further, the frame processing section 203 informs a control section 220 of frame timing and slot timing.

Reference numeral 206 denotes a display unit which notifies the user of a call from the master unit 300 and displays an image of received image data. Reference numeral 208 denotes a slot/frequency table storage unit which is stored with a slot/frequency table used in the DECT scheme. Reference numeral 209 designates an order-indicative numbers storage unit which stores order-indicative numbers that are attached to the received image data.

Reference numerals 211 and 212 denote a microphone and a speaker, respectively. Reference numeral 210 denotes a sound processing section which amplifies and converts into a PCM signal an analog sound signal that is input through the microphone 211, and which also converts a PCM sound signal into an analog sound signal to be output to the speaker 211 and amplifies the analog sound signal. Reference numeral 220 designates the control section which performs a control on the basis of order-indicative numbers attached to the received image data so that the received image is displayed, and which also controls the entire monitor slave unit 200. Reference numeral 215 stands for a manipulation unit through which a monitor manipulation or a menu manipulation is performed which is directed to the camera slave unit 100.

Figure 3:
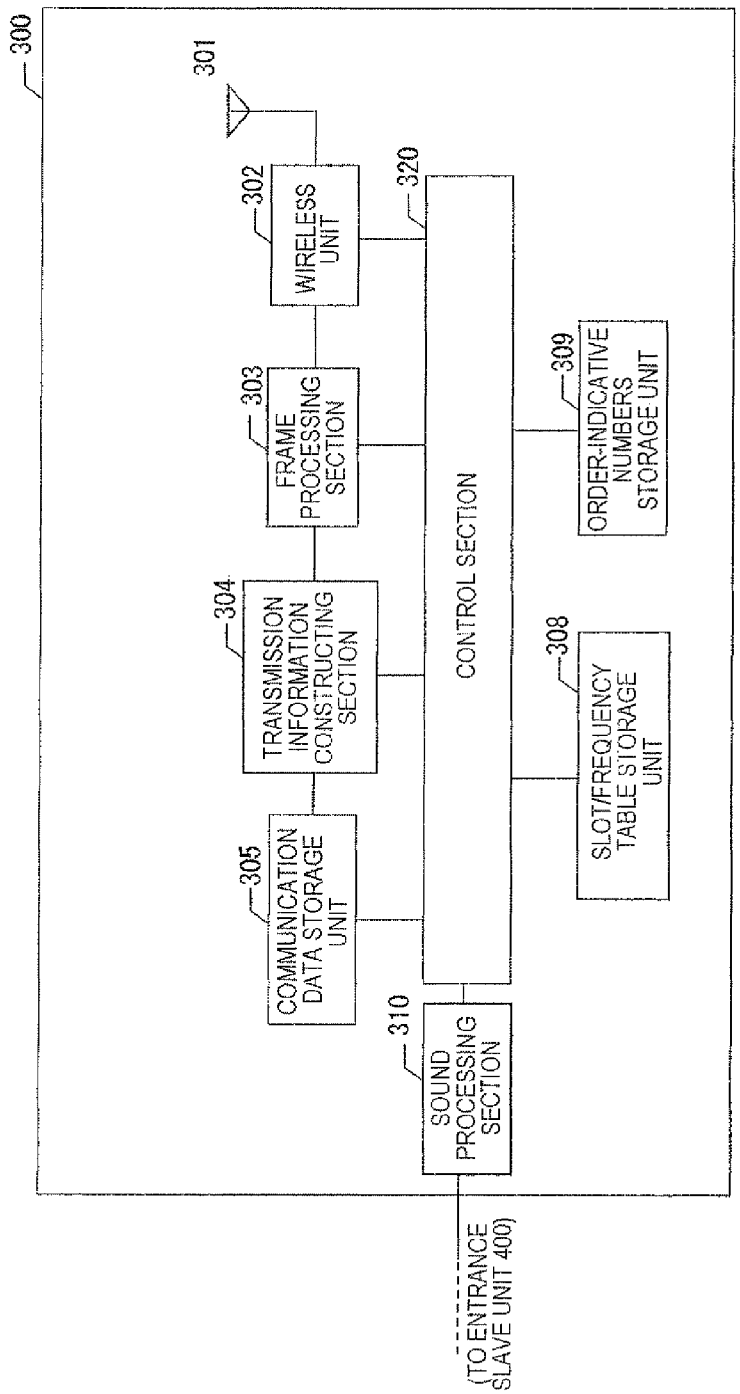
FIG. 3 is a functional block diagram of a master unit of the door monitoring system according to the embodiment.

FIG. 3 is a functional block diagram of the master unit 300 of the door monitoring system. The master unit 300 has a function necessary to serve as a master unit for maintaining system synchronization, and also has a function of receiving image data from the camera salve unit 100 and transfers it to the monitor slave unit 200. Reference numeral 301 denotes an antenna. Reference numeral 302 denotes a wireless unit which performs a wireless communication according to TDMA-TDD and DECT scheme; that is, the wireless unit 302 modulates and amplifies an input data sequence and outputs resulting data, and also amplifies and demodulates a received wireless signal and outputs resulting reception data. Reference numeral 303 denotes a frame processing section which adds a sync signal necessary for TDMA-TDD communication and an error detection signal (i.e., a signal for error detection) to a control signal and generates a transmission data sequence with timing that is suitable for the timing of a TDMA frame and slot. Furthermore, the frame processing section 303 performs error detection processing on a received data sequence with timing that is suitable for the timing of a TDMA frame and slot, and outputs a control signal or image data received in error-free slots. Still further, the frame processing section 303 informs a control section 320 of frame timing and slot timing.

Reference numeral 304 denotes a transmission information constructing section which reads image data from a communication data storage unit 305, divides it into pieces of data each of which can be transmitted in one slot, and outputs resulting transmission data after attaching order-indicative numbers to them.

The communication data storage unit 305 has a storage area capable of storing image data of at least one screen. Reference numeral 308 denotes a slot/frequency table storage unit which is stored with a slot/frequency table used in the DECT scheme. Reference numeral 309 denotes an order-indicative numbers storage unit which stores order-indicative numbers that are attached to the received image data.

Reference numeral 310 denotes a sound processing section which converts, into a PCM signal, an analog sound signal that is transmitted from the entrance slave unit 400, and which also converts a PCM sound signal into an analog sound signal to be sent to the entrance slave unit 400. When a voice call is performed between the entrance slave unit 400 and the monitor slave unit 200, a sound signal received from the entrance slave unit 400 is converted by the sound processing section 310 into a PCM signal, which is passed to the frame processing section 303. The PCM signal is converted by the frame processing section 303 into a signal having a format for sound data, which is sent to the monitor slave unit 200 through the wireless unit 302. A sound signal transmitted from the monitor slave unit 200 is received by the wireless unit 302, converted into an analog sound signal by the sound processing section 310, and sent to the entrance slave unit 400. Reference numeral 320 designates a control section which performs a control on the basis of order-indicative numbers attached to the received image data so that the received image data is transferred, and which also controls the entire master unit 300.

Next, a description will be made of how the above-configured door monitoring system operates. The door monitoring system including the master unit 300 which operates as a control station and the camera slave unit 100 and the monitor slave unit 200 which operate as tributary stations have two states, that is, an image communication state and an idle state. The image communication state indicates where image data is being transmitted from the monitor slave unit 200 to the camera slave unit 100 via the master unit 300 after calling of the monitor slave unit 200 from the monitor slave unit 200 via the master unit 300.

Figure 5A:
FIGS. 5A to 5C show formats of transmission/reception data used in the door monitoring system according to the embodiment.

First, operations performed in the idle state will be described. FIG. 6 illustrates how slots are used for transmission and reception in the idle state. In the idle state, the master unit 300 sends a control signal regularly in a particular slot of each 10-msec frame. Using the control signal, the master unit 300 informs each of the camera slave unit 100 and the monitor slave unit 200 of its own identification information, a number of a slot (hereinafter referred to as a control slot) in which the control signal is being sent, a slot/frequency table of the control slot, a standby slot/frequency table of a reception slot, an image transmission start signal (call signal), etc. In the example of FIG. 6, a control signal is sent using slot-1. The control signal is sent in a format shown in FIG. 5A in which a sync signal is attached before a control data field and a CRC signal (CRC1 shown in FIG. 5A) for error detection in the control data field is attached after the control data field. A control signal such as the identification information of the master unit 300 itself is sent being contained in a control data field.

More specifically, the control section 320 outputs a control signal to the frame processing section 303 with timing that is suitable for the timing of a control slot on the basis of slot timing information received from the frame processing section 303. The control section 320 refers to the slot/frequency table storage unit 308, determines a transmission frequency on the basis of the slot/frequency table used for the control slot and an index managed in the control section 320, and controls the wireless unit 302 so that it sends a control signal at the thus-determined frequency. The frame processing section 303 adds a sync signal and a signal (CRC1 shown in FIG. 5A) for error detection in the control data field to the control signal, and outputs a resulting control signal to the wireless unit 302. The wireless unit 302 modulates a carrier with a data sequence including such control signals, amplifies a resulting signal, and sends out an amplified signal from the antenna 301.

In the idle state, the master unit 300 attempts to receive a control signal of a wireless link establishment request from the monitor slave unit 200 using reception slots (hereinafter referred to as standby slots) which are reception slots of each frame other than a reception slot corresponding to the control slot. In the example of FIG. 6, the master unit 300 waits for arrival of, for example, a wireless link establishment request from the monitor slave unit 200 using, as standby slots, slot-8 to slot-12, that is, the reception slots of each frame (slot-7 to slot-12) excluding slot-7 which corresponds to the control slot.

More specifically, the control section 320 determines reception frequencies by referring to the slot/frequency table storage unit 308 with timings that are suitable for the timings of the standby slots on the basis of slot timing information given by the frame processing section 303, and controls the wireless unit 302 so that it receives a control signal at the frequencies determined for the respective standby slots. When a control signal of a wireless link establishment request is received from the monitor slave unit 200 and reception data is supplied to the frame processing section 303, the frame processing section 303 separates control data and an error detection signal from each other using a sync signal as a reference and judges whether or not an error exists. The frame processing section 303 informs the control section 320 of the data sequence of an error-free control data, that is, a control signal of a wireless link establishment request, whereupon an operation of establishing a bidirectional master-slave wireless link is activated. In the example of FIG. 6, the monitor slave unit 200 sends a control signal of a wireless link establishment request to the master unit 300 using slot-11, and the master unit 300 receives this signal.

Next, how the monitor slave unit 200 operates to complete a master unit capturing operation after being powered on will be described. The monitor slave unit 200 starts a master unit capturing operation as soon as it is powered on. More specifically, to find a control signal transmitted from the master unit 300, the monitor slave unit 200 searches for a control signal transmitted from the master unit 300 by performing receiving operations consecutively while switching the reception frequency and slot. Once confirming that a signal received at a certain frequency in a certain slot is a control signal transmitted from the master unit 300, in the subsequent frames the monitor slave unit 200 continues to receive control signals transmitted from the master unit 300 using the slot having the same slot number as the slot in which the above control signal is received, whereby frame/slot locking is attained with the master unit 300 and DECT synchronization is established. That is, the monitor slave unit 200 acquires a number of a transmission slot that is used for transmission of a control signal from the master unit 300, a frame number at that time, slot/frequency table information, etc. which are contained in the control signal. From that time onward, time-division communication can be performed in synchronism with the operation of the master unit 300.

How the monitor slave unit 200 operates to establish synchronization with the master unit 300 and make a transition to a frame intermittent receiving operation will be described below with reference to FIG. 4. A reception data sequence that has been received and demodulated by the wireless unit 202 (see FIG. 4) is output to the frame processing section 203 from the wireless unit 202. The frame processing section 203 attempts to detect a sync signal from the reception data sequence. If a sync signal is detected, the frame processing section 203 separates control data and an error detection signal from each other using the sync signal as a reference and performs an error judgment on the control data using the separated error detection signal. If it is judged that the control data has been received normally, the frame processing section 203 outputs the received reception data sequence in the control data field to the control section 220.

The control section 220 analyzes the reception data sequence received from the frame processing section 203, and judges whether or not the received signal is a signal transmitted from the standby-target master unit 300 on the basis of the identification information of the master unit 300 contained in the received control signal. If the judgment result is affirmative, the control section 220 performs a control so that a transition is made to a frame intermittent receiving operation.

In the intermittent receiving operation, the control section 220 detects a frame number, a slot number, and a frequency of transmission of a control signal from the master unit 300 to the monitor slave unit 200 on the basis of information transmitted from the master unit 300 being contained in a control signal and the information stored in the slot/frequency table storage unit 208. Then, the control section 220 of the monitor slave unit 200 suspends the receiving operation. Even during the receiving operation suspension period, the control section 220 attempts to detect timing to restart a receiving operation by counting internal clock pulses and comparing the count with data stored in the slot/frequency table 208. If timing to restart a receiving operation has been reached, the control section 220 controls the wireless unit 202 so that a receiving operation is restarted.

Next, how the camera slave unit 100 operates to perform a master unit capturing operation and start a time-division communication with synchronization with the master unit 300 will be described. In this case, like the monitor slave unit 200, the camera slave unit 100 starts a master unit capturing operation as soon as it is powered on. More specifically, to find a control signal transmitted from the master unit 300, the camera slave unit 100 searches for a control signal transmitted from the master unit 300 by performing receiving operations consecutively while switching the reception frequency and slot. Once confirming that a signal received at a certain frequency in a certain slot is a control signal transmitted from the master unit 300, in the subsequent frames the camera slave unit 100 continues to receive control signals transmitted from the master unit 300 using the slot having the same slot number as the slot in which the above control signal is received, whereby frame/slot locking is attained with the master unit 300 and DECT synchronization is established. That is, the camera slave unit 100 acquires a number of a transmission slot that is used for transmission of a control signal from the master unit 300, a frame number at that time, slot/frequency table information, etc. which are contained in the control signal. From that time onward, time-division communication can be performed in synchronism with the operation of the master unit 300.

Figure 11:
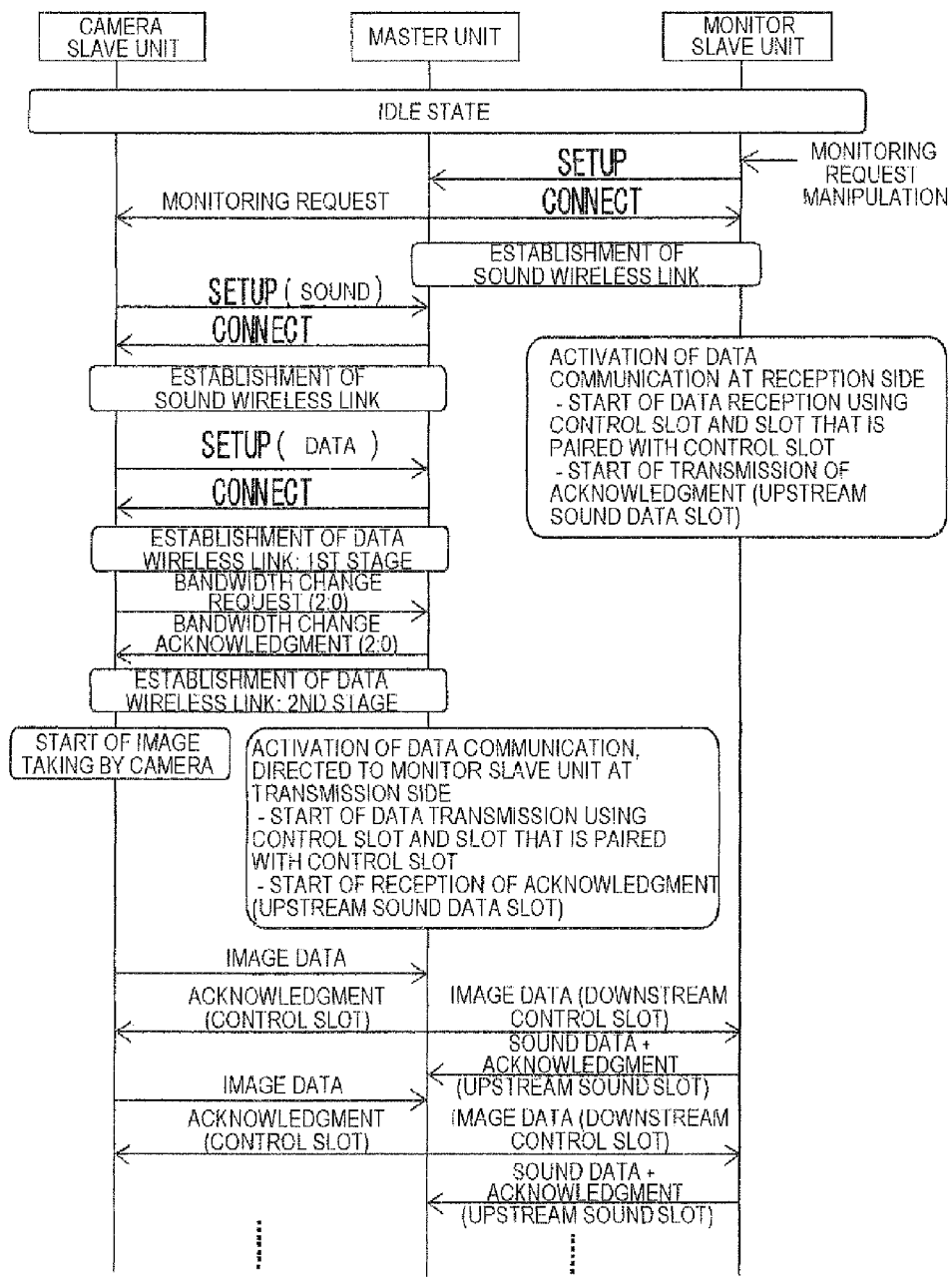
FIG. 11 is a timing chart of an operation that the camera slave unit sends image data to the monitor slave unit via the master unit in the door monitoring system according to the embodiment.

Upon the establishment of synchronization with the master unit 300, the camera slave unit 100 makes a transition to an intermittent receiving operation like the monitor slave unit 200 does. However, in the case of the camera slave unit 100, the interval of the intermittent receiving operation is set shorter than in the case of the monitor slave unit 200 because the camera slave unit 100 needs to quickly respond to an imaging instruction from the monitor slave unit 200, for example. FIG. 11 is a timing chart of an operation that the camera slave unit 100 sends image data to the monitor slave unit 200 via the master unit 300 in the door monitoring system according to the embodiment.

Next, operations performed in the image communication state will be described with reference to FIGS. 6 to 11. If the user makes an image monitoring request manipulation by manipulating the manipulation unit 215 of the monitor slave unit 200, the monitor slave unit 200 sends a control signal of a link establishment request (SETUP) to the master unit 300.

On detecting the link establishment request transmitted from the monitor slave unit 200, the control section 320 of the master unit 300 sends a monitoring request instruction to the camera slave unit 100 using a control signal. In the example of FIG. 6, the control section 320 sends a monitoring request instruction to the camera slave unit 100 using slot-1 (control slot). At the same time, the master unit 300 sends, to the monitor slave unit 200, information (CONNECT) to the effect that wireless link activation is being started.

In the master unit 300, the control section 320 is informed of the link establishment request that has been transmitted from the monitor slave unit 200 and activates an operation of establishing a bidirectional sound wireless link between the monitor slave unit 200 and the master unit 300. FIG. 7 shows a state where a bidirectional wireless link is established between the monitor slave unit 200 and the master unit 300. To establish a voice call path between the master unit 300 and the monitor slave unit 200 later, in the example of FIG. 7, slot-11 is secured to send a signal from the monitor slave unit 200 to the master unit 300 using slot-11 and send a signal from the master unit 300 to the monitor slave unit 200 using slot-5 which has a particular relationship with slot-11.

In response to the monitoring request instruction transmitted from the master unit 300, first, the camera slave unit 100 starts a procedure for establishing a sound wireless link. More specifically, the camera slave unit 100 sends, to the master unit 300, a control signal of a link establishment request (SETUP (sound)) for establishment of a sound wireless link. Upon detecting the link establishment request transmitted from the camera slave unit 100, the control section 320 of the master unit 300 sends, to the camera slave unit 100, information (CONNECT) to the effect that sound wireless link activation is being started, whereby an operation of establishing a bidirectional sound wireless link between the camera slave unit 100 and the master unit 300 is activated.

Upon establishment of a sound wireless link with the master unit 300, as shown in FIG. 11 the camera slave unit 100 starts a procedure for establishing a data wireless link. More specifically, the camera slave unit 100 sends, to the master unit 300, a control signal of a link establishment request (SETUP (data)) for establishment of a data wireless link. Upon detecting the link establishment request transmitted from the camera slave unit 100, the control section 320 of the master unit 300 sends, to the camera slave unit 100, information (CONNECT) to the effect that data wireless link activation is being started, whereby an operation of establishing a bidirectional data wireless link between the camera slave unit 100 and the master unit 300 is activated.

As for the bidirectional data wireless link between the camera slave unit 100 and the master unit 300, at a first stage, a bidirectional wireless link is established in which one slot is used in each of the upstream direction and the downstream direction in one frame. Then, as shown in FIG. 11, a bandwidth change request is sent from the camera slave unit 100 to the master unit 300. Upon completing preparations, the master unit 300 returns a bandwidth change acknowledgment to the camera slave unit 100. As a result, the data wireless link is switched to a second stage. At the second stage, one slot in the downstream direction (i.e., from the master unit 300 to the camera slave unit 100) is changed to an upstream slot, whereby two slots are secured in the upstream direction (i.e., from the camera slave unit 100 to the master unit 300). In an example of FIG. 8, slot-3 and slot-9 are used for data transmission in the upstream direction. From that time onward, these two slots are used when an image is transmitted from the camera slave unit 100.

Figure 5B:
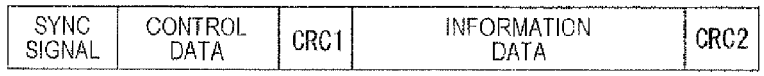

Upon establishment of the data wireless link with two upstream slots between the camera slave unit 100 and the master unit 300, the camera slave unit 100 starts an image taking operation and the master unit 300 starts transmission of image data to the monitor slave unit 200. More specifically, the control section 120 of the camera slave unit 100 supplies the transmission information constructing section 105 and the frame processing section 103 with image transmission start information for announcing a start of transmission of image data. Then, the control section 120 controls respective sections and units to send the image transmission start information using the slots (in the example of FIG. 8, slot-3 and slot-9) designated by the master unit 300 using a control signal. More specifically, the control section 120 outputs image transmission start information to the frame processing section 103 with timings that are suitable for the timings of slot-3 and slot-9 on the basis of frame timing and slot timing that are given by the frame processing section 103. The frame processing section 103 sets the image transmission start information in the control data field and adds a sync signal and an error detection signal according to the format shown in FIG. 5B, and outputs a resulting data sequence to the wireless unit 102. The wireless unit 102 modulates a carrier with the data sequence received from the frame processing section 103, and sends out a resulting signal of the image transmission start information via the antenna 101.

When informed of a start of transmission of image data, the transmission information constructing section 105 requests the communication data storage unit 104 to update the image data. The communication data storage unit 104 activates the camera unit 106, causes it to take an image, and updates the image data. The transmission information constructing section 105 initializes a pointer that indicates the position of last-output image data in the order-indicative numbers managed by the transmission information constructing section 105. Then, the transmission information constructing section 105 outputs, to the frame processing section 103, image data (hereinafter called divisional image data) that is given an order-indicative number and has such a length as to be able to be transmitted in one slot every time an image data request is received from the frame processing section 103.

An operation of dividing image data into parts having such a length as to be transmitted in one slot and sending the same divisional image data doubly will be described below in detail. The same divisional image data is output in the following manner. When receiving an image data request from the frame processing section 103, the transmission information constructing section 105 refers to the image data stored in the communication data storage unit 104, reads image data (divisional image data) having such a length as to be transmitted in one slot of non-output image data according to the pointer indicating the position of last-output image data, and attaches an order-indicative number to it. The transmission information constructing section 105 outputs, to the frame processing section 103, divisional image data that is given the same order-indicative number as the immediately preceding divisional image data. After outputting the divisional image data that is given the same order-indicative number, the transmission information constructing section 105 updates the pointer indicating the position of last-output image data. When all of the image data stored in the communication data storage unit 104 has been transmitted, the transmission information constructing section 105 again requests the communication data storage unit 104 to update the image data. Controls are made so that a new image is taken by the camera unit 106 and stored in the communication data storage unit 104 (the image data is updated), and divisional image data of the updated image data are output consecutively.

On the other hand, when informed of a start of transmission of image data, the frame processing section 103 gives an image data request to the transmission information constructing section 105 with timings that are suitable for the timings of two slots (slot-3 and slot-9) having a positional relationship that is predetermined for each frame. Then, the frame processing section 103 generates a transmission data sequence using divisional image data that is received from the transmission information constructing section 105 and to which an order-indicative number is attached, and outputs the generated transmission data sequence to the wireless unit 102. The slot transmission data sequence for transmission of the divisional image data to which the order-indicative number is attached is generated according to the format shown in FIG. 5B, and the order-indicative-number-attached divisional image data is sent being contained in the information data field. At this time, a signal (CRC2 shown in FIG. 5B) for error detection in the information data field is added to the data sequence. The frame processing section 103 sets the image data in the information data field and passes the resulting transmission data sequence to the wireless unit 102. The wireless unit 102 modulates a carrier with the transmission data sequence received from the frame processing section 103, and sends out image transmission start information to via the antenna 101.

Next, a description will be made of how the master unit 300 operates in the image communication state. Upon sending an image data transmission start request to the camera slave unit 100, the master unit 300 makes a transition to the image communication state for transmission of image data to the monitor slave unit 200. When the master unit 300 has received image transmission start information that is transmitted from the camera slave unit 100 in slot-3 (or slot-9 which is paired with slot-3), the control unit 320 of the master unit 300 changes, to "unreceived," the states of order-indicative numbers that are stored in the order-indicative numbers storage unit 309 as corresponding to received image data and starts reception of image data using the designated slot-3 and slot-9. That is, the control unit 320 controls the frame processing section 303 and the wireless unit 302 to start reception of image data using slot-3 and slot-9. More specifically, the control section 320 controls the wireless unit 302 so that it reads, from the slot/frequency table storage unit 308, frequency information corresponding to slots in which to receive image data and sets an image data receiving frequency and slots with timings that are suitable for the timings of these slots on the basis of frame timing and slot timing that are given by the frame processing section 303.

When image data are transmitted from the camera slave unit 100 in slot-3 and slot-9, the wireless signals of these slots are received and demodulated by the wireless unit 302 of the master unit 300 and reception data sequences are output to the frame processing section 303. The frame processing section 303 separates error detection signals from order-indicative-number-attached divisional image data that have been transmitted being contained in the information data fields on the basis of sync signals of the reception data sequences received in the respective slots. If no error is found, the frame processing section 303 informs the control section 320 of the received order-indicative-number-attached divisional image data. The control section 320 reads order-indicative numbers stored in the order-indicative numbers storage unit 309. If the order-indicative numbers of the received image data do not coincide with those stored in the order-indicative numbers storage unit 309, the control section 320 prepares for transfer of the received divisional image data to the monitor slave unit 200 as they are. The transfer of image data to the monitor slave unit 200 will be described later in detail.

In the slot diversity mode, the camera slave unit 100 sends the same image data doubly (i.e., two times) attaching the same order-indicative number to it. In this case, if the order-indicative number of received image data does not coincide with the order-indicative number stored in the order-indicative numbers storage unit 309, the master unit 300 transfers the received image data to the monitor slave unit 200 as it is and updates the order-indicative number stored in the order-indicative numbers storage unit 309 to the order-indicative number of the received image data. On the other hand, if the order-indicative number of received image data coincides with the order-indicative number stored in the order-indicative numbers storage unit 309, the master unit 300 performs controls so as to discard the received image data because it means that the same image data has already been received normally. As seen from the above description, in the slot diversity mode, even if one of two identical image data that are sent from the camera slave unit 100 does not reach the master unit 300 normally, a lack of that image data can be prevented as long as the other image data reaches the master unit 300 normally.

Next, how the master unit 300 operates to send image data to the monitor slave unit 200 will be described. First, the control section 320 sends a control signal (hereinafter referred to as image transmission start information) for announcing a start of transmission of image data using a control slot. More specifically, the control section 320 outputs image transmission start information to the frame processing section 303 with timing that is suitable for the timing of the control slot on the basis of frame timing and slot timing that are given by the frame processing section 303. The frame processing section 303 sets the image transmission start information in the control data field, adds a sync signal and an error detection signal to it, and outputs a resulting data sequence to the wireless unit 302. The wireless unit 302 modulates a carrier with the data sequence received from the frame processing section 303, and sends out a resulting signal of the image transmission start information via the antenna 301.

Then, the control section 320 informs the transmission information constructing section 304 and the frame processing section 303 of a start of transmission of image data. In response, the transmission information constructing section 304 requests the communication data storage unit 305 to update the image data. The communication data storage unit 305 stores image data received from the camera slave unit 100; that is, the communication data storage unit 305 updates the image data every time it receives new image data. The transmission information constructing section 304 initializes the order-indicative numbers and transmission data pointers which are managed by itself. The transmission information constructing section 304 outputs, to the frame processing section 303, image data (hereinafter referred to as divisional image data) that has such a length as to be transmitted in one slot and to which an order-indicative number is attached every time it is requested to supply image data by the frame processing section 303.

More specifically, when requested to supply image data by the frame processing section 303, the transmission information constructing section 304 refers to the image data stored in the communication data storage unit 305, reads image data (divisional image data) having such a length as to be transmitted in one slot of non-output image data according to a pointer that indicates a predetermined transmission-scheduled position, attaches an order-indicative number to it, and outputs resulting image data to the frame processing section 303. After outputting the order-indicative-number-attached divisional image data, the transmission information constructing section 304 updates a pointer that indicates the position of last-output image data. When all of the image data stored in the communication data storage unit 305 has been transmitted, the transmission information constructing section 304 again requests the communication data storage unit 305 to update the image data. Controls are made so that new image data transmitted from the camera slave unit 100 is stored in the communication data storage unit 305 (the image data is updated), and divisional image data of the updated image data are output consecutively.

On the other hand, when informed of a start of transmission of image data, the frame processing section 303 gives an image data request to the transmission information constructing section 304 with timings that are suitable for the timings of two slots (in the example of FIG. 8, slot-1 and slot-7) having a positional relationship that is predetermined for each frame. Then, the frame processing section 303 generates a transmission data sequence using divisional image data that is received from the transmission information constructing section 304 and to which an order-indicative number is attached, and outputs the generated transmission data sequence to the wireless unit 302. The slot transmission data sequence for transmission of the divisional image data to which the order-indicative number is attached is sent according to the format shown in FIG. 5C. To transfer the order-indicative-number-attached divisional image data to the monitor slave unit 200, the frame processing section 303 sets the image data in a monitor slave unit data field (see FIG. 5C). At the same time, the frame processing section 303 sets an acknowledgment (ACK) to the camera slave unit 100 in a camera slave unit field (see FIG. 5C). At this time, signals (CRC3 shown in FIG. 5C) for error detection in the slave unit data field are added to the data sequence. The wireless unit 302 modulates a carrier with the data sequence received from the frame processing section 303, and sends out a resulting signal to via the antenna 301. Referring to the flowchart of FIG. 11, when image data are transmitted from the camera slave unit 100 in the paired slots, that is, slot-3 and slot-9, the master unit 300 sets an acknowledgment (ACK) to the camera slave unit 100 in data to be sent in slot-1 and sets image data to be transferred to the monitor slave unit 200 in the data to be sent in the same slot-1.

Since as described above an acknowledgment (ACK) for informing the transmission source camera slave unit 100 of normal reception is sent using a slot for transfer, to the monitor slave unit 200, of information transmitted from the camera slave unit 100, it is not necessary to secure a separate slot for transmission of an acknowledgment to the camera slave unit 100. Thus, slots can be utilized efficiently.

Next, how the monitor slave unit 200 operates to receive image data will be described. As described above, after sending a call start request to the master unit 300, the monitor slave unit 200 makes a transition to a state to wait for transfer of image data. When image data are transmitted to the monitor slave unit 200 in slot-1 and slot-7 which are paired with each other, the wireless signals of these slots are received and demodulated by the wireless unit 202 of the monitor slave unit 200 and reception data sequences are output to the frame processing section 203.

The frame processing section 203 separates error detection signals from order-indicative-number-attached divisional image data that have been transmitted being contained in the monitor slave unit data field on the basis of sync signals of the reception data sequences received in the respective slots. And the frame processing section 203 judges whether or not an error exists on the basis of the error signals. If no error is found, the frame processing section 203 informs the control section 220 of the received order-indicative-number-attached divisional image data. The control section 320 reads order-indicative numbers stored in the order-indicative numbers storage unit 209. If the order-indicative numbers of the received image data do not coincide with those stored in the order-indicative numbers storage unit 209, the control section 220 performs controls so that the received divisional image data are displayed on the display unit 206 as they are.

In the slot diversity mode, as in the above-described case of the transmission from the camera slave unit 100, the master unit 300 sends the same image data doubly (i.e., two times) attaching the same order-indicative number to it. In this case, if the order-indicative number of received image data does not coincide with the order-indicative number stored in the order-indicative numbers storage unit 209, the monitor slave unit 200 displays the received divisional image data on the display unit 206 as it is and updates the order-indicative number stored in the order-indicative numbers storage unit 209 to the order-indicative number of the received image data. On the other hand, if the order-indicative number of received image data coincides with the order-indicative number stored in the order-indicative numbers storage unit 309, the monitor slave unit 200 performs controls so as to discard the received image data because it means that the same image data has already been received normally. As seen from the above description, in the slot diversity mode, even if one of two identical image data that are sent from the master unit 300 does not reach the monitor slave unit 200 normally, a lack of that image data can be prevented as long as the other image data reaches the monitor slave unit 200 normally.

Next, a description will be made of how a voice call between the monitor slave unit 200 and the entrance slave unit 400 is started. When the user who has seen an image taken by the camera slave unit 100 using the monitor slave unit 200 makes a call start manipulation on the monitor slave unit 200, the monitor slave unit 200 sends a control signal of a call start request to the master unit 300. When receiving the control signal of the call start request from the monitor slave unit 200, the control section 320 is informed of this request and controls respective sections and units to establish a voice call path. As described above, slot-11 and slot-5 are secured between the master unit 300 and the monitor slave unit 200 for a wireless voice call path (see FIG. 7).

A sound signal that is input through the microphone 211 of the monitor slave unit 200 is converted into a PCM sound signal by the sound processing section 210. The control section 220 passes the PCM sound signal to the frame processing section 203. The frame processing section 203 converts the PCM sound signal into a sound signal having a sound data format and outputs the latter to the wireless unit 202. The wireless unit 202 sends the received sound signal to the master unit 300 using slot-11. A sound signal processed by the master unit 300 is sent to the monitor slave unit 200 using slot-5 and received by the wireless unit 202. The control section 220 supplies this PCM sound signal to the sound processing section 210. The sound processing section 210 converts the received PCM sound signal into an analog 80 mid signal and the speaker 212 outputs a resulting voice.

A sound signal transmitted from the entrance slave unit 400 is converted into a PCM sound signal by the sound processing section 310 of the master unit 300. The control section 320 passes the PCM sound signal to the frame processing section 303. The frame processing section 303 converts the PCM sound signal into a sound signal having a sound data format and outputs the latter to the wireless unit 302. The wireless unit 302 sends the received sound signal to the monitor slave unit 200 using slot-5. A sound signal that originates from the monitor slave unit 200 is transmitted to the master unit 300 using slot-11 and received by the wireless unit 302. The control section 320 supplies this PCM sound signal to the sound processing section 310. The sound processing section 310 converts the received PCM sound signal into an analog sound signal, which is set to the entrance slave unit 400.

Next, a description will be made of how a voice call is performed between the monitor slave unit 200 and the camera slave unit 100. FIG. 9 illustrates an example manner of use of slots in a state where a voice call path is also established between the camera slave unit 100 in parallel with transfer of image data originating from the camera slave unit 100 to the master unit 300 in the door monitoring system according to the embodiment. When the user who has seen an image taken by the camera slave unit 100 using the monitor slave unit 200 makes a manipulation for starting a call with the camera slave unit 100, the monitor slave unit 200 sends a control signal of a call start request to the master unit 300. When receiving the control signal of the call start request from the monitor slave unit 200, the control section 320 is informed of this request and controls individual sections and units to form a voice call path between the master unit 300 and the camera slave unit 100. In an example of FIG. 9, slot-2 and slot-8 which has a particular relationship with slot-2 are newly assigned so that a signal is sent from the master unit 300 to the camera slave unit 100 using slot-2 and a signal is sent from the camera slave unit 100 to the master unit 300 using slot-8.

A sound signal that is input through the microphone 111 of the camera slave unit 100 is converted into a PCM sound signal by the sound processing section 110. The control section 120 passes the PCM sound signal to the frame processing section 103. The frame processing section 103 converts the PCM sound signal into a sound signal having a sound data format and outputs the latter to the wireless unit 102. The wireless unit 102 sends the received sound signal to the master unit 300 using slot-8. A sound signal processed by the master unit 300 is sent to the camera slave unit 100 using slot-2 and received by the wireless unit 102. The control section 120 supplies this PCM sound signal to the sound processing section 110. The sound processing section 110 converts the received PCM sound signal into an analog sound signal and the speaker 112 outputs a resulting voice. Also in this case, as shown in FIG. 7, slot-11 and slot-5 are used for the voice call path between the monitor slave unit 200 and the master unit 300.

Figure 5C:
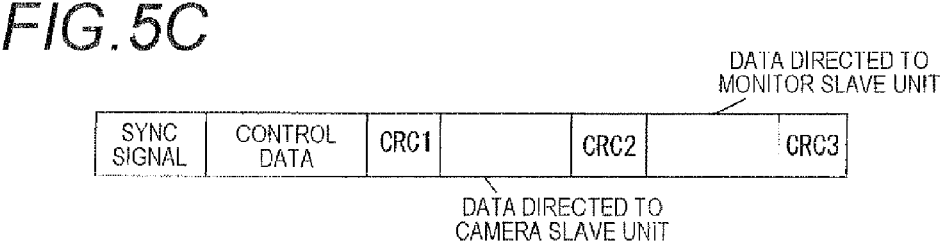

As for the operation of sending image data from the master unit 300 to the monitor slave unit 200, the monitor slave unit 200 needs to send, to the master unit 300, an acknowledgment (ACK) for informing the master unit 300 that the image data has been received normally. In the embodiment, a format similar to the format shown in FIG. 5C is used when the monitor slave unit 200 sends data (transmission data sequence) using slot-11. As shown in FIG. 9, an acknowledgment (ACK) is transmitted together with sound data using slot-11 which is used for transmitting the sound data from the monitor slave unit 200 to the master unit 300. More specifically, the frame processing section 203 of the monitor slave unit 200 sets sound data in a master unit data field, and at the same time, sets an acknowledgment (ACK) to the master unit 300 in another data field (the same slot as used for the transmission of the sound data is used). Since an acknowledgment (ACK) and sound data are sent using a single slot for transfer, it is not necessary to assign separate slots to them for their transmission. Thus, wireless communication resources can be utilized efficiently.

A modification of the above-described embodiment will be described below. In performing a transfer operation, the master unit 300 receives image data from the camera slave unit 100 using a certain single slot (first slot) and divides the image data received using this single slot into two parts (hereinafter referred to two divisional image data). Each of the two divisional image data can be transferred in a time length that is half of the time length of one slot.

The master unit 300 sends one of the two divisional image data to the monitor slave unit 200 using another slot (second slot), and sends the other divisional image data to the monitor slave unit 200 using yet another slot (third slot). Furthermore, the master unit 300 sends a control signal for maintaining the synchronization to each of the slave units 100 and 200 using one of the second slot and the third slot, and sends an acknowledgment (ACK) of the image data to the camera slave unit 100 using the other of the second slot and the third slot.

Figure 10:
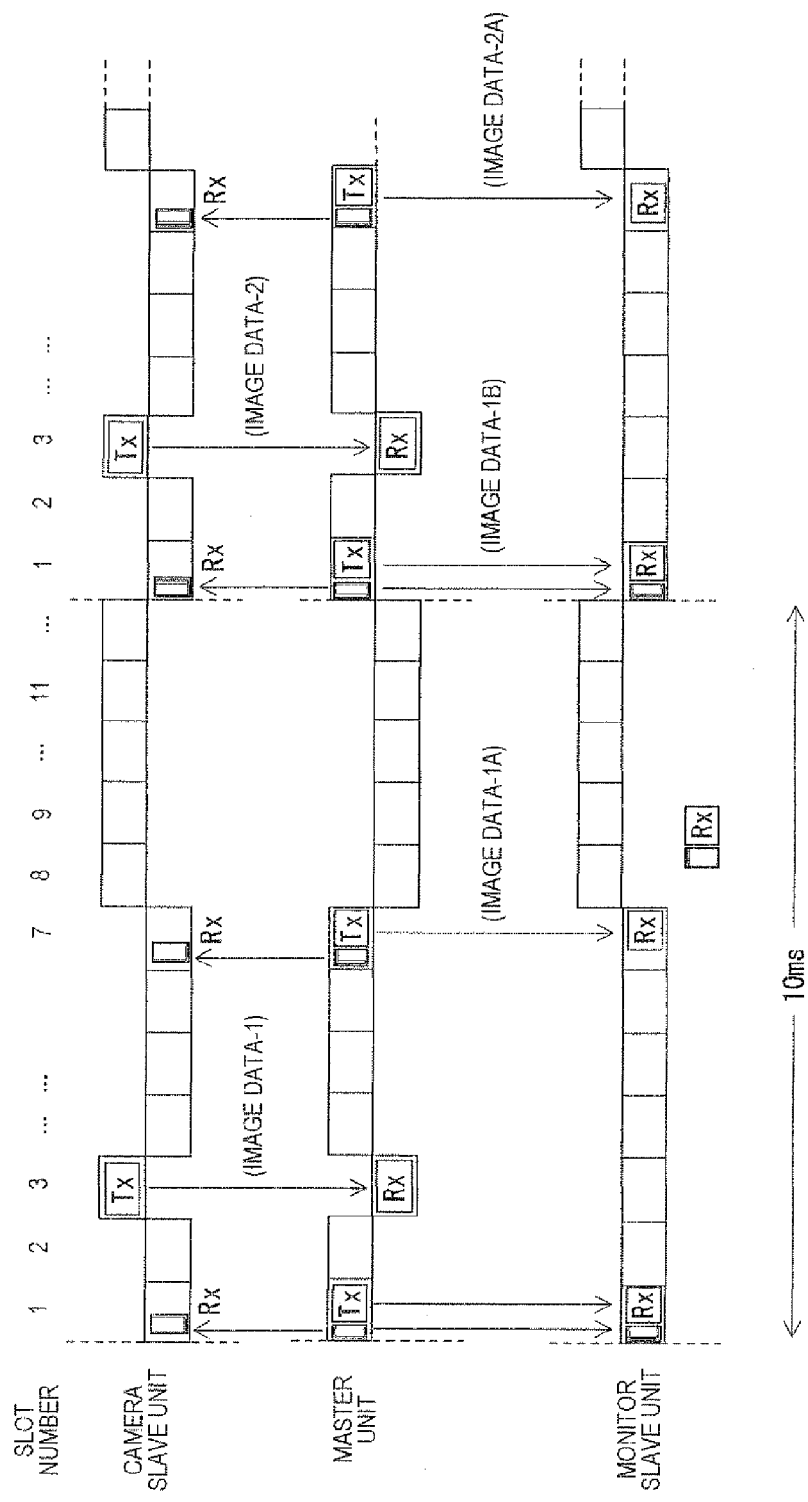
FIG. 10 illustrates an example manner of use of slots in a case where image data transmitted from the camera slave unit is transferred after being divided into two parts in the door monitoring system according to the embodiment.

FIG. 10 illustrates an example manner of use of slots in a case that image data transmitted from the camera slave unit 100 is transferred after being divided into two parts in the door monitoring system according to the embodiment. In performing a transfer operation, the master unit 300 receives image data (image data-1) from the camera slave unit 100 using slot-3 and divides the received image data into two parts (two divisional image data). The master unit 300 sends one (image data-1A) of the two divisional image data to the monitor slave unit 200 using slot-7 and sends the other divisional image data (image data-1B) to the monitor slave unit 200 using slot-1. Furthermore, the master unit 300 sends a control signal for maintaining the synchronization to each of the slave units 100 and 200 using slot-1, and sends an acknowledgment (ACK) of the image data to the camera slave unit 100 using slot-7. The monitor slave unit 200 receives image data-1 from the master unit 300 using slot-1 and slot-7. On the other hand, the camera slave unit 100 receives the acknowledgment from the master unit 300 using slot-7.

As described above, the master unit 300 sends image data using two slots each of which has a time length that is only half of the time length of one ordinary slot. Therefore, a control signal or an acknowledgment to a transmission source (camera slave unit 100) can be sent using the remaining time length and hence it is not necessary to assign a separate slot to the control signal or the acknowledgment for its transmission. Thus, wireless communication resources can be utilized efficiently.

The present application is based upon and claims the benefit of Japanese patent application No. 2011-256461 filed on Nov. 24, 2011, the contents of which are incorporated by reference in its entirety.

The present invention makes it possible to utilize wireless communication resources in data transfer in a wireless communication system in which communications are performed according to TDMA-TDD and a control station can perform data transfer between plural tributary stations.

What is claimed is:

1. A wireless communication apparatus which operates as a control station of controlling a first wireless communication apparatus and a second wireless communication apparatus, the wireless communication apparatus comprising:
   a controller which receives data from the first wireless communication apparatus using a first slot, and sends the received data to the second wireless communication apparatus and an acknowledgment of reception of the data to the first wireless communication apparatus, wherein the controller divides the data transmitted from the first wireless communication apparatus using the first slot into two divisional data, sends one of the two divisional data to the second wireless communication apparatus using the second slot and the other divisional data to the second wireless communication apparatus third slot, sends a control signal for maintaining a synchronization using one of the second slot and the third slot, and sends an acknowledgment of reception of the data to the first wireless communication apparatus using the other of the second slot and the third slot.

2. The wireless communication apparatus according to claim 1, further comprising:
   a communicator which communicates a signal with the first and second wireless communication apparatuses in accordance with TDMA (Time Division Multiple Access) scheme;
   the controller causes the first and second wireless communication apparatuses to synchronize with the wireless communication apparatus by sending a control signal to the first and second wireless communication apparatuses via the communicator.

3. The wireless communication apparatus according to claim 2, wherein the controller designates the first slot and the second slot and sends information indicating the first slot and the second slot while being contained in the control signal to the first wireless communication apparatus and the second wireless communication apparatus prior to sending one of the two divisional data to the second wireless communication apparatus, wherein the first slot is used for receiving the data from the first wireless communication apparatus and the second slot is used for sending one of the two divisional data to the second wireless communication apparatus.

4. A wireless communication system, comprising the first wireless communication apparatus, the second wireless communication apparatus, and the wireless communication apparatus according to claim 3 as a third wireless communication apparatus, wherein
the first wireless communication apparatus includes a first communicator which performs a signal communication with a different wireless communication apparatus in accordance with TDMA scheme, and
the second wireless communication apparatus includes a second communicator which performs a signal communication with a different wireless communication apparatus in accordance with TDMA scheme.

5. The wireless communication system according to claim 4, wherein
the first wireless communication apparatus further includes:
a first master unit detector which synchronizes the first wireless communication apparatus with the third wireless communication apparatus by detecting a control signal transmitted from the third wireless communication apparatus and received by the first communicator; and
a first storage which stores information necessary for synchronization with the third wireless communication apparatus,
the second wireless communication apparatus further includes:
a second master unit detector which synchronizes the second wireless communication apparatus with the third wireless communication apparatus by detecting a control signal transmitted from the third wireless communication apparatus and received by the second communicator; and
a second storage which stores information necessary for synchronization with the third wireless communication apparatus,
the controller of the third wireless communication apparatus controls a transfer operation of receiving data from the first wireless communication apparatus and transferring the received data to the second wireless communication apparatus,
the first wireless communication apparatus sends data using the first slot according to the information contained in the control signal,
the second wireless communication apparatus receives the two divisional data from the third wireless communication apparatus using the second slot anal the third slot according to the information contained in the control signal, and
the first wireless communication apparatus receives the acknowledgement from the third wireless communication apparatus using one of the second slot and the third slot according to the information contained in the control signal.

6. A wireless communication system, comprising the first wireless communication apparatus, the second wireless communication apparatus, and the wireless communication apparatus according to claim 1 as a third wireless communication apparatus, wherein
the first wireless communication apparatus receives the acknowledgement which is transmitted from the third wireless communication apparatus using the other of the second slot and the third slot,
the second wireless communication apparatus receives the one of the two divisional data which is transmitted from the third wireless communication apparatus using the second slot.

7. A wireless communication system, comprising the first wireless communication apparatus, the second wireless communication apparatus, and the wireless communication apparatus according to claim 1 as a third wireless communication apparatus, wherein
the first wireless communication apparatus receives the acknowledgement which is transmitted from the third wireless communication apparatus using the other of the second slot and the third slot, and
the second wireless communication apparatus receives the two divisional data which are transmitted from the third wireless communication apparatus using both the second slot and the third slot.

8. The wireless communication system according to claim 7, wherein
the first wireless communication apparatus includes a first communicator which communicates a signal with a different wireless communication apparatus in accordance with TDMA (Time Division Multiple Access) scheme,
the second wireless communication apparatus includes a second communicator which communicates a signal with a different wireless communication apparatus in accordance with TDMA scheme,
the third wireless communication apparatus includes a third communicator which communicates a signal with a different wireless communication apparatus in accordance with TDMA scheme, and
the controller causes the first and second wireless communication apparatuses to synchronize with the third wireless communication apparatus by sending a control signal to the first and second wireless communication apparatuses via the communicator.

9. A wireless communication method in a wireless communication system comprising a first wireless communication apparatus, a second wireless communication apparatus, and a third wireless communication apparatus which operates as a control station of controlling the first wireless communication apparatus and the second wireless communication apparatus, wherein
the first wireless communication apparatus includes:
a first communicator which performs a signal communication with a different wireless communication apparatus in accordance with TDMA (Time Division Multiple Access) scheme;
a first master unit detector which synchronizes the first wireless communication apparatus with the third wireless communication apparatus by detecting a control signal transmitted from the third wireless communication apparatus and received by the first communicator; and
a first storage which stores information necessary for synchronization with the third wireless communication apparatus,
the second wireless communication apparatus includes:
a second communicator which performs a signal communication with a different wireless communication apparatus in accordance with TDMA scheme;
a second master unit detector which synchronizes the second wireless communication apparatus with the third wireless communication apparatus by detecting a control signal transmitted from the third wireless communication apparatus and received by the second communicator; and
a second storage which stores information necessary for synchronization with the third wireless communication apparatus,
the third wireless communication apparatus includes:
a third communicator which performs a signal communication with a different wireless communication apparatus in accordance with TDMA scheme; and
a controller which causes the first wireless communication apparatus and the second wireless communication apparatus to synchronize with the third wireless communication apparatus by sending a control signal to the first wireless communication apparatus and the second wireless communication apparatus using the third communicator, and to control a transfer operation of receiving data from the first wireless communication apparatus and transferring the received data to the second wireless communication apparatus,
the wireless communication method comprising:
designating, by the third wireless communication apparatus, a first slot and a second slot and sends information indicating the first slot and the second slot while being contained in the control signal to the first wireless communication apparatus and the second wireless communication apparatus prior to the transfer operation, wherein the first slot is used for receiving the data from the first wireless communication apparatus and the second slot is used for sending the received data to the second wireless communication apparatus, and
the transfer operation includes
sending data from the first wireless communication apparatus using the first slot according to the information contained in the control signal,
receiving the data by the third wireless communication apparatus from the first wireless communication apparatus using the first slot,
sending the received data to the second wireless communication apparatus and an acknowledgment of reception of the data to the first wireless communication apparatus using the second slot from the third wireless communication apparatus,
receiving the data by the second wireless communication apparatus from the third wireless communication apparatus using the second slot according to the information contained in the control signal, and
receiving the acknowledgement by the first wireless communication apparatus from the third wireless communication apparatus using the second slot according to the information contained in the control signal.

* * * * *